United States Patent
Clark et al.

(10) Patent No.: US 12,285,719 B2
(45) Date of Patent: Apr. 29, 2025

(54) SOLAR-DRIVEN MEMBRANE-BASED OPEN-CYCLE ADSORPTION AIR CONDITIONER

(71) Applicant: Ohio State Innovation Foundation, Columbus, OH (US)

(72) Inventors: Jordan D. Clark, Columbus, OH (US); Casey Wade, Columbus, OH (US); W. S. Winston Ho, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 464 days.

(21) Appl. No.: 17/430,564

(22) PCT Filed: Feb. 14, 2020

(86) PCT No.: PCT/US2020/018257
§ 371 (c)(1),
(2) Date: Aug. 12, 2021

(87) PCT Pub. No.: WO2020/168171
PCT Pub. Date: Aug. 20, 2020

(65) Prior Publication Data
US 2022/0134277 A1     May 5, 2022

Related U.S. Application Data (60) Provisional application No. 62/835,763, filed on Apr. 18, 2019, provisional application No. 62/806,463, filed on Feb. 15, 2019.

(51) Int. Cl.
*B01D 53/26*     (2006.01)
*B01D 53/06*     (2006.01)
(Continued)

(52) U.S. Cl.
CPC .......... *B01D 53/261* (2013.01); *B01D 53/06* (2013.01); *B01D 53/28* (2013.01); *B01J 20/226* (2013.01);
(Continued)

(58) Field of Classification Search
CPC ...... B01D 53/261; B01D 53/06; B01D 53/28; F24S 21/00; B01J 20/226; F24F 3/1411; F24F 5/0035; F24F 12/006
See application file for complete search history.

(56) References Cited

U.S. PATENT DOCUMENTS 5,817,167 A * 10/1998 DesChamps ........... B01D 53/06
                                                                                                           95/114
8,790,451 B1 * 7/2014 Narayanamurthy ........................
                                                                                                           B01D 53/263
                                                                                                                  96/111

(Continued)

FOREIGN PATENT DOCUMENTS

WO    WO-2007058260 A1 * 5/2007 ............. F24F 12/006

OTHER PUBLICATIONS

WO-2007058260-A1 Translation (Year: 2007).*

(Continued)

*Primary Examiner* — Schyler S Sanks
(74) *Attorney, Agent, or Firm* — Wood Herron & Evans LLP (57) ABSTRACT

An air conditioning system and method of air conditioning is provided. The air conditioning system includes an intake mechanism configured to draw into the air conditioner a first amount of air and an amount of moisture from an exterior of the air conditioner. The system further includes metal organic frameworks in fluid communication with the intake mechanism, the metal organic frameworks configured to adsorb the amount of moisture from the first amount of air.

(Continued)

The system further includes an indirect evaporative cooler configured to cool the first amount of air. The system further includes a solar heater configured to heat a second amount of air. The system further includes a heat exchanger configured to contact the second amount of air with the metal organic frameworks to regenerate the metal organic frameworks.

27 Claims, 5 Drawing Sheets

(51) Int. Cl.
    *B01D 53/28*     (2006.01)
    *B01J 20/22*     (2006.01)
    *B01J 20/26*     (2006.01)
    *B01J 20/28*     (2006.01)
    *B01J 20/34*     (2006.01)
    *F24F 3/14*     (2006.01)
    *F24F 5/00*     (2006.01)
    *F24S 21/00*     (2018.01)

(52) U.S. Cl.
    CPC ......... *B01J 20/26* (2013.01); *B01J 20/28004* (2013.01); *B01J 20/28026* (2013.01); *B01J 20/28033* (2013.01); *B01J 20/3425* (2013.01); *B01J 20/3483* (2013.01); *F24F 3/1411* (2013.01); *F24F 5/0035* (2013.01); *F24S 21/00* (2018.05); *B01D 2253/204* (2013.01); *B01D 2257/80* (2013.01)

(56) References Cited

U.S. PATENT DOCUMENTS

| | | | |
|---|---|---|---|
| 2003/0033829 A1* | 2/2003 | Smith | F25B 17/08 62/480 |
| 2011/0067426 A1 | 3/2011 | Hwang et al. | |
| 2012/0077019 A1* | 3/2012 | Knoben | B01D 67/0079 427/407.1 |
| 2015/0136316 A1* | 5/2015 | Chen | B01J 20/18 156/60 |
| 2018/0339284 A1* | 11/2018 | Yang | B01J 20/267 |

OTHER PUBLICATIONS

Furukawa, Hiroyasu, et al. "Water adsorption in porous metal-organic frameworks and related materials." Journal of the American Chemical Society 136.11 (2014): 4369-4381. (Year: 2014).*
International Searching Authority, European Patent Office, International Search Report and Written Opinion issued in corresponding PCT Application No. PCT/US2020/018257, mailed May 28, 2020, 15 pages.

* cited by examiner

SOLAR-DRIVEN MEMBRANE-BASED OPEN-CYCLE ADSORPTION AIR CONDITIONER

CROSS-REFERENCE TO RELATED APPLICATIONS

This application is a U.S. National Phase Application of International Application No. PCT/US2020/018257, filed Feb. 14, 2020, claiming priority to and benefits from the filing date of U.S. Provisional Application No. 62/806,863, filed Feb. 15, 2019, the entire contents of which are hereby incorporated by reference in their entirety. This application further claims priority to and benefits from the filing date of U.S. Provisional Application No. 62/835,763, filed Apr. 18, 2019, the entire contents of which is hereby incorporated by reference in its entirety

TECHNICAL FIELD

This disclosure relates to air conditioners, and more particularly to adsorption, solar-driven air conditioners.

BACKGROUND

Air conditioning accounts for 5% of the United States' energy expenditure and 45% of peak summer electrical demand, and offers few system level opportunities to shirt the load over multi-hour time scales. Largely unchanged since its development in 1902, the vapor compression cycle used in the vast majority of air conditioning applications requires an electrical input and provides dehumidification in a somewhat inelegant way, by over-cooling air and thus condensing moisture from the airstream. Air must then often be reheated with an additional energy source in order to bring it to the temperatures desired for supply to a building.

Air conditioning cycles have been augmented with components, usually metal energy exchanger wheels covered in an inorganic adsorbent material (called desiccant wheels), which adiabatically and passively adsorb moisture and improve efficiency over the vapor compression cycle. However, these adsorbents must then be regenerated using a high-temperature thermal energy source to drive off the adsorbed moisture. This precludes the exclusive use of waste heat from condensers or other equipment, or the use of solar thermal heaters for regeneration. Other systems have been devised which use liquid solutions which similarly absorb moisture and then are regenerated by heating the solutions. Although both of these types of systems are more efficient than bare vapor-compression systems, non-renewable energy sources cannot yet power these solutions because the sorbents require too high of a regeneration temperature due to their shallow Type 3 water sorption isotherm.

Other secondary shortcomings plague the performance of systems which employ vapor compression in conjunction with solid or liquid sorbents. Microbes which may be harmful to human health grow on cooling coils and drip pans of vapor compression systems. Liquid absorbents are usually salt solutions which may be destructive to downstream components if carryover into the airstream occurs and thus filters with large pressure drops must be added after the liquid sorbent contactors. Solid sorbent wheels become fouled over time by particulates in the air stream. Therefore, a need exists to lower energy usage in air conditioners, regenerate adsorbents at lower temperatures, and incorporate a renewable energy source to provide energy to renew adsorbents.

SUMMARY OF THE INVENTION

In one embodiment, an air conditioner including an intake mechanism configured to draw into the air conditioner a first amount of air and an amount of moisture from an exterior of the air conditioner is provided. The air conditioner further includes a metal organic frameworks-based heat and mass exchanger in fluid communication with the intake mechanism, and the metal organic frameworks-based heat and mass exchanger is configured to adsorb moisture from the first amount of air. The air conditioner further includes a solar heater configured to heat a second amount of air. The air conditioner further includes a heat exchanger configured to contact the second amount of air with the metal organic frameworks to regenerate the metal organic frameworks-based heat and mass exchanger.

In a related embodiment, an air conditioner including an intake mechanism configured to draw into the air conditioner a first amount of air and an amount of moisture from an exterior of the air conditioner is provided. The air conditioner further includes a module in fluid communication with the intake mechanism, and the module includes a metal organic frameworks-based heat and mass exchanger, the metal organic frameworks-based heat and mass exchanger configured to adsorb the amount of moisture from the first amount of air and a cooler configured to cool metal organic framework. The air conditioner further includes a solar heater configured to heat a second amount of air, and a heat exchanger configured to contact the second amount of air with the metal organic frameworks to regenerate the metal organic framework.

In a related embodiment, a method of air conditioning is provided. The method includes drawing a first amount of air into an interior of an air conditioner from an exterior of the air conditioner, the first amount of air including an amount of moisture. The method further including adsorbing the amount of moisture into an approximately unsaturated metal organic frameworks-based heat and mass exchanger to form a partially saturated metal organic frameworks-based heat and mass exchanger. The method further including heating a second amount of air with a solar heater to form an amount of hot air, wherein the hot air has a temperature greater than a temperature of the second amount of air. The method further including regenerating the partially saturated metal organic frameworks-based heat and mass exchanger to form the partially unsaturated metal organic frameworks-based heat and mass exchanger by removing the amount of moisture by contacting the amount of hot air with the partially saturated metal organic frameworks-based heat and mass exchanger.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, an air conditioner including an intake mechanism configured to draw air and moisture into the air conditioners from an exterior of the air conditioner is provided. The air conditioner further includes a metal organic frameworks-based heat and mass exchanger in fluid communication with the intake mechanism, and the metal organic frameworks-based heat and mass exchanger configured to adsorb the moisture from the air drawn into the air conditioner. The air conditioner further includes a solar heater and a heat exchanger configured to together remove the moisture adsorbed by the metal organic framework, thus regenerating the metal organic framework.

One interesting feature of the systems and methods described below is that the air conditioner may use only heat supplied from the solar heater to regenerate the metal organic framework. Alternatively in addition, the air conditioner may avoid the use of less efficient air conditioner configurations such as vapor compression. Alternatively or in addition, an interesting feature of the systems and methods described below may be that the air conditioner passively cleans gaseous pollutants from the air taken therethrough by removing unwanted compositions from the air. For example, the air conditioner may adsorb harmful compositions like formaldehyde from the intake air.

Figure 1:
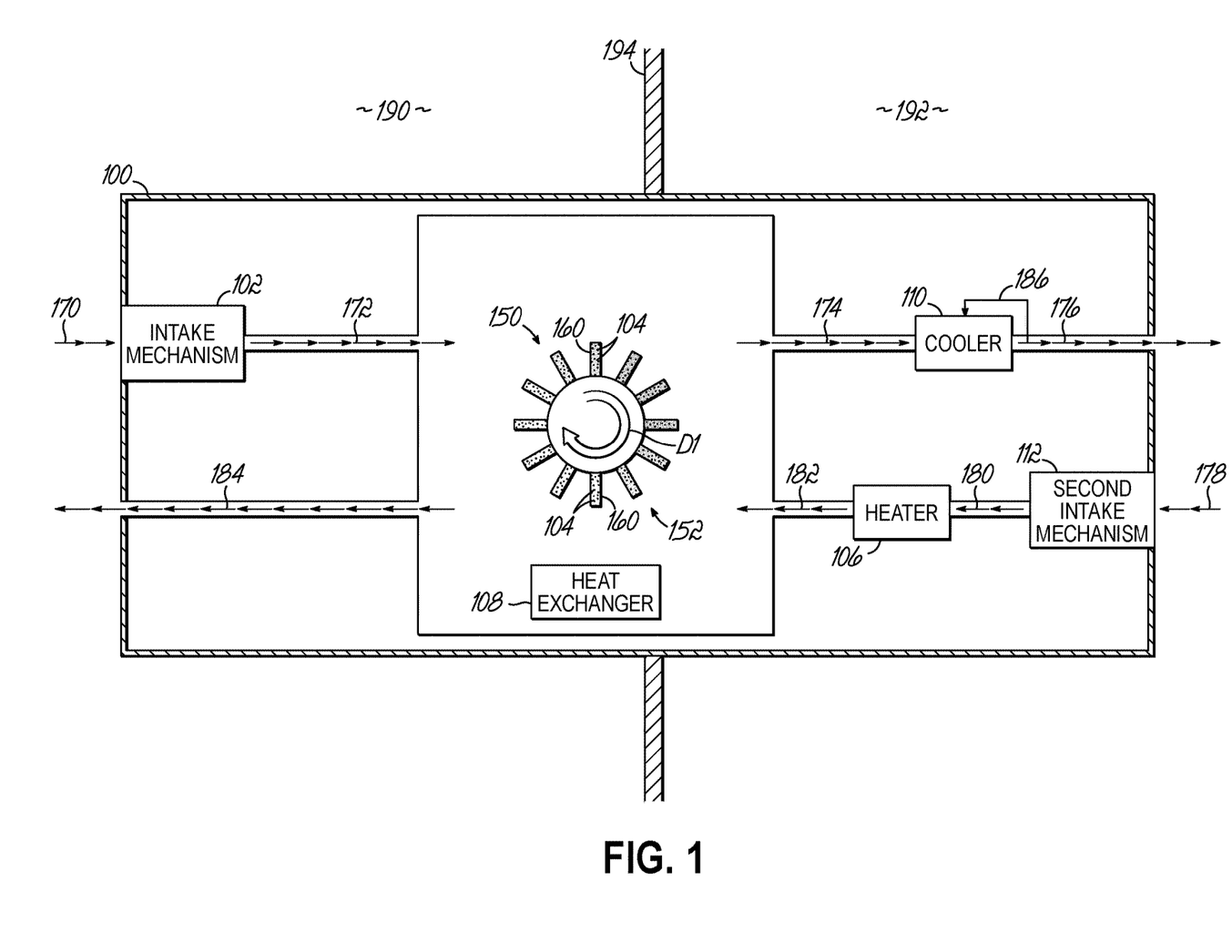
FIG. 1 illustrates a schematic of an example of an air conditioner system.

FIG. 1 illustrates a schematic of an example of an air conditioner system 100. The system 100 includes a first intake mechanism 102, metal organic frameworks ("MOFs") 104, a membrane 160, a heater 106, a heat exchanger 108, an indirect evaporative cooler 110, and a second intake mechanism 112. The membrane 160 and MOF 104 may together form a MOF-based dehumidifier. The indirect evaporative cooler 110 may be substituted for a vapor-compression device that works in conjunction with the MOF-based dehumidifier and still be within the scope of the air conditioner system 100. An MOF-based dehumidifier is a non-limiting example of a metal organic frameworks-based heat and mass exchanger discussed throughout the specification. The air conditioner system 100 is shown positioned in a wall 194 of a structure separating an interior 192 of the structure from an exterior 190 of the structure. This arrangement is merely illustrative of a possible position of the air conditioner system 100 and is intended to be non-limiting.

The first intake mechanism 102 is an apparatus, system, or device configured to draw air from the exterior 190 of the structure, the exterior 190 of the structure is located outside of the air conditioner system 100 into the air conditioner system 100. The air may be located outside of a structure that the air conditioner system 100 is positioned, at least partially, within. The first intake mechanism 102 may be, for example, a fan rotatable around an axis. The rotation of the fan may draw or direct air from the exterior 190 of the structure into the air conditioner system 100 for further processing, and form a first air and moisture stream 170. The air drawn into the air conditioner system 100 from the exterior of the air conditioner system 100 includes an amount of moisture.

The first air and moisture stream 170 includes the air and moisture drawn into the air conditioning system 100 by the first intake mechanism 102. The amount of air and moisture included in the first air and moisture stream 170 results in the first air and moisture stream 170 having a relative humidity.

The first air and moisture stream 170 is drawn into the air conditioner system 100 by the first intake mechanism 102 to form the first intake air stream 172 included within the air conditioner system 100. The air and moisture included in the first intake air stream 172 is subjected to further processing inside the air conditioner system 100. For example, the air and moisture included in the first intake air stream 172 is contacted with the metal organic frameworks (MOFs) 104. Moisture included in the first intake air stream 172 is adsorbed onto unsaturated metal sites located on a surface of the MOFs 104. The MOFs 104 included in the air conditioner system 100 includes a partially or completely unsaturated portion 150 and a partially or completely saturated portion 152. Alternatively or in addition, a first portion of the MOFs 104 may be partially or completely unsaturated while simultaneously a second portion of the MOFs 104 may be partially or completely saturated. During operation of the air conditioner system 100, the air and moisture included in the first intake air stream 172 is contacted with the partially or completely unsaturated portion 150 of the MOFs 104. The partially or completely unsaturated portion 150 of the MOFs 104 adsorbs an amount of the moisture included in the first intake air stream 172 resulting in the partially or completely unsaturated portion 150 of the MOFs 104 to become the partially or completely saturated portion 152 of the MOFs 104.

In some examples, as shown in FIG. 1, the MOFs 104 are distributed into the membrane 160, and the membrane 160 may be located on a rotatable apparatus such as a wheel. The rotatable apparatus may rotate in a direction D1 around an axis. The rotation of the rotatable apparatus allows the least saturated portion of the partially or completely unsaturated portion 150 of the MOFs 104 to be exposed to the first intake air stream 172 prior to other portions of the partially or completely unsaturated portion 150 of the MOFs 104. As the first intake air stream 172 travels through the membrane 160, the MOFs 104 distributed within the membrane 160 become further saturated with moisture as the MOFs 104 adsorbs moisture from the first intake air stream 172, and the membranes 160, including the distributed MOFs 104, rotates in the direction D1. Eventually, the partially or completely unsaturated portion 150 of the MOFs 104 becomes partially or completely saturated thus forming the partially or completely saturated portion 152 of the MOFs 104, at which time the partially or completely saturated portion 152 of the MOFs 104 may be exposed to a regeneration stream 182 described below.

As a result of the adsorption of the amount of moisture from the first intake air stream 172 by the MOFs 104, the air and moisture not adsorbed by the MOFs 104 forms a dry stream 174. The dry stream 174 has a lower relative humidity than the first intake air stream 172. The air and any moisture in the dry stream 174 is then carried on inside the air conditioner system 100 for further processing.

The MOFs 104 are not necessarily limited to adsorbing only moisture from the first intake air stream 172. For example, the MOFs 104 may adsorb contaminants such as formaldehyde that may be present in the air drawn into the air conditioner system 100. The MOFs 104 have an affinity for water or other polar molecules. The affinity for water or other polar molecules may result from a number of mechanisms such as, strong chemisorptive interactions with coordinatively unsaturated metal sites. Other common molecules such as nitrogen gas, oxygen gas, and carbon dioxide, for example, typically interact much more weakly at the unsaturated metal sites than water, other polar molecules, or contaminants. Alternatively or in addition, the MOFs' 104 affinity for water may result from physisorptive interactions with organic linkers or metal secondary building units. The MOFs 104 may include polar functional groups such as amines, hydroxyls, sulfoxides, etc., the presence of which may increase the hydrophilicity of the MOFs 104 by, for example, promoting water clustering at the unsaturated metal sites. Promotion of water clusters at unsaturated metal sites on the MOFs 104 increases adsorption of the MOFs 104 at least by increasing the probability of water molecules being adsorbed at an unsaturated metal site. Alternatively or in addition, the MOFs 104 may include a pore diameter of 2 nm or less, or alternatively, less than about 2 nm. Materials with pores smaller than this diameter will only accommodate water clusters, while larger pore diameters will result in clustering and capillary condensation. Capillary condensation is usually undesirable as it leads to hysteresis in the adsorption/desorption isotherms.

The MOFs 104 may include a variety of suitable materials such that the MOFs 104 are configured to both adsorb the amount of moisture from the first intake air stream 172 and is configured to be regenerated at temperatures of between 75° C. and 90° C., inclusively. For example, the MOFs 104 may include (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I(Zn/Co), having formula $Zn_xCo_{5-x}Cl_4(BTDD)_3$, where x is 2 or 3, (4) $Co_2Cl_2(BTDD)$, having formula $Co_2Cl_2(BTDD)$, (5) CAU-10 having formula $Al(OH)(mBDC)$, (6) MOF-841, having formula $Zr_6O_4(OH)_4 (MTB)_2(HCO_2)(H_2O)_2$, (7) MIL-68-$NH_2$, having formula $M(OH)(BDC-NH_2)$, or combinations thereof, where BDC can be either 1,3-benzenedicarboxylate or 1,4-benzenedicarboxylate, BTDD is bis(1,2,3-triazolo[4,5-b],[40,50-i])dibenzo[1,4]dioxin, MTB is 4,4',4'',4'''-Methanetetrayltetrabenzoate, BDC-$NH_2$ is 2-amino-1,4-benzenedicarboxylate, and M is aluminum, gallium, indium, or iron. In some examples, the MOFs 104 have a water adsorption capacity of more than or equal to 50 percent by weight, preferably greater than or equal to 100 percent by weight. Alternatively or in addition, in some examples, the MOFs 104 have a particle size of less than 1 micron. The MOFs 104 may include bonding sites at which the moisture from the first intake air stream adsorb to.

The membrane 160 is a polymer membrane configured to hold the MOFs 104 in place during operation of the air conditioner system 100. Suitable membrane materials for the membrane may include a dispersion of nanoparticles of thermally conductive metals in a water vapor barrier, a dispersion of thermally conductive carbon-containing nanoparticles or nanosheets in a water vapor barrier, thermally conductive polymers, and blends thereof. The dispersion of nanoparticles of thermally conductive metals may include, for example, copper, nickel, zinc, aluminum, iron and the like in water vapor barriers including polyethylene (PE), polypropylene (PP), polyvinylidene difluoride (PVDF), polyacrylonitrile (PAN), fluorinated polymer and copolymer, polystyrene (PS), polyester/polyethylene terephthalate (PET), polyurethane (PU), polysulfone (PSF), polyethersulfone (PES), polyimide (PI), polycarbonate (PC), and polyvinyl chloride (PVC). The dispersion of thermally conductive carbon-containing nanoparticles or nanosheets may include, for example, carbon black, carbon nanotubes, graphene, graphene oxide and the like in water vapor barriers including polyethylene (PE), polypropylene (PP), polyvinylidene difluoride (PVDF), polyacrylonitrile (PAN), fluorinated polymer and copolymer, polystyrene (PS), polyester/polyethylene terephthalate (PET), polyurethane (PU), polysulfone (PSF), polyethersulfone (PES), polyimide (PI), polycarbonate (PC), and polyvinyl chloride (PVC). The thermally conductive polymers may include, for example, polyaniline, polyacetylene, polyphenylene vinylene, polypyrrole, polythiophene, poly(3,4-ethylenedioxythiophene), polyphenylene sulfide, polycarbazole, polyindole, polyazepine, poly(fluorene), polypyrene, polyazulene, and polynaphthalene. The thickness of the membrane 160 is in a range of between 0.04 microns and 400 microns, inclusively, preferably between 0.4 microns and 40 microns, inclusively, and most preferably between 4 microns and 10 microns, inclusively.

The membrane 160 may be coupled to the rotatable apparatus, such as the wheel, as shown in FIG. 1. The membrane 160 rotates with the rotatable apparatus in direction D1, carrying the MOF 104 along in the same direction D1. The membranes 160 are rolled into a spiral wound module to better contact the process air and moisture moving through the air conditioner system 100.

After the air and moisture included in the dry stream 174 is cooled by an indirect evaporative cooler 110. The indirect evaporative cooler 110 is configured to cool a temperature of the air to a predetermined desired temperature. The indirect evaporative cooler 110 may indirectly bring the air into thermal communication with an amount of an evaporative fluid. For example, the air may be inside a bladder or shell with the evaporative fluid on an outer surface of the bladder or shell. The evaporative fluid is at a lower temperature than the air included in the dry stream 174 coming into the bladder or shell. The air in the bladder or shell contacts the inner surface of the bladder or shell, prompting thermal energy in the dry stream 174 to be transferred through the bladder or shell and causing the evaporative fluid on the outer surface of the bladder or shell to evaporate. Thus, energy is removed from the dry stream 174 inside the bladder or shell, and the dry stream 174 inside the bladder or shell is cooled. In such a case, the indirect evaporative cooler 110 is considered "indirect" at least because the dry stream 174 does not directly contact or mix with the evaporative fluid, and the evaporative fluid does not contaminate or mix with the dry stream 174. As a result only a thermal exchange between the dry stream 174 and the evaporative fluid occurs. The amount of energy transferred from the dry stream 174 to the evaporative fluid is sufficient to result in a temperature of the dry stream 174 being reduced to a predetermined temperature. The indirect evaporative cooler requires less energy to operate than other cooler varieties, such as vapor compression-based coolers.

The dry stream 174 forms a process stream 176 after the dry stream 174 is cooled by the indirect evaporative cooler 110. The process stream 176 includes the air and moisture included in the dry stream 174, but the process stream 176 has a lower temperature than the dry stream 174 at least as a result of the cooler 110 operations, for example thermal energy being transferred from the dry stream 174 into the evaporative fluid. The temperature of the process stream 176 may be predetermined, or set by a user operating the air conditioner system 100. The process stream 176 is discharged into the interior 192 of the structure.

Once the air included in the process stream 176 reaches the predetermined temperature, the process stream 176 is dispensed into the interior 192 of the structure to be air conditioned, such as a room of a structure. The air conditioner system 100 includes the second intake mechanism 112. The second intake mechanism 112 is an apparatus, system, or device configured to draw air from outside of the air conditioner system 100, for example the interior 192 of the structure, into the air conditioner system 100. In some examples, the air may be inside a space or room that the air conditioner system 100 is positioned within. Alternatively or in addition, the air drawn in by the second intake mechanism 112 may be from outside the space or room in which the air conditioner system 100 is placed. The second intake mechanism 112 may be, for example, a fan rotatable around an axis. The axis of rotation of the second intake mechanism 112 may be a same or different axis of rotation than the first intake mechanism 102. The rotation of the fan may draw or direct air from the interior 192 of the structure into the air conditioner system 100 for further processing, and form a second air and moisture stream 178.

In addition, a portion of the process steam 176 is siphoned away to form a cooling stream 186. The cooling stream 186 is fed into a wet side of the cooler 110 to assist with cooling the dry stream 174. The cooling stream 186 may be combined with air from outside the air conditioner system 100 to form a cooling stream 302, discussed below in relation to FIGS. 3A and 3B. At least because the air included in the cooling stream 186 has already been dehumidified by the MOF 104, the air in the cooling stream 186 has a low relative humidity and thus encourages evaporation of an evaporative fluid film 306, discussed below in relation to FIGS. 3A and 3B, and assists in the cooler's 110 performance.

In some examples, the second air and moisture stream 178 includes the air and moisture drawn into the air conditioning system 100 by the second intake mechanism 112 is taken from the interior 192 of the structure. Alternatively or in addition, the second air and moisture stream 178 includes an amount of air and moisture drawn into the air conditioner system 100 from the exterior 190 of the structure by the second intake mechanism 112 (this arrangement is not shown).

The second air and moisture stream 178 is drawn into the air conditioner system 100 by the second intake mechanism 112 to form the second intake air stream 180 included within the air conditioner system 100. The air and moisture included in the second intake air stream 180 is subjected to further processing inside the air conditioner system 100. For example, the air included in the second intake air stream 180 is heated by the heater 106. The heater 106 may be a solar heater. Alternatively or in addition, the heater 106 may be configured to raise the temperature of the air drawn into the air conditioner system 100 to between 75° C. and 90° C., inclusively. The heater 106 may be the only source of heat included in the air conditioner system 100. The heater 106 supplies thermal energy to the air in the second intake air stream 180. At least in examples where the heater 106 is a solar heater, the heater 106 may covert solar energy into thermal energy and supply the air in the second intake air stream 180 with thermal energy. In some examples, the solar heater 106 is the only heat source included in the air conditioner system 100.

At least as a result of the heater 106 supplying the air in the second intake air stream 180 with thermal energy, a temperature of the air in the second intake air stream 180 increases, and forms a regeneration stream 182. The temperature of the air in the regeneration stream 182 may be between 75° C. and 90° C., inclusively. At such a temperature, the air included in the regeneration stream 182 is brought into contact with the partially or completely saturated portion 152 of the MOF 104 distributed within the membrane 160. The air included in the regeneration stream 182 regenerates the partially or completely saturated portion 152 of the MOF 104 to form the partially or completely unsaturated portion 150 of the MOF 104. That is to state, the water present at the metal sites on the MOF 104 are released from the MOF 104 and absorbed into the regeneration stream 182 to form an exhaust stream 184, and thus the metal sites on the MOF 104 are available to adsorb molecules, such as water or contaminants, present in any future air or moisture drawn into the air conditioner system 100, by, for example, the first intake mechanism 102.

In some examples, the regeneration stream 182 is supplied to the heat exchanger 108. The heat exchanger 108 provides a physical barrier between the regeneration stream 182 and the MOF 104. However, the heat exchanger 108 permits the regeneration stream 182 to thermally communicate with the MOF 104 distributed within the membrane 160, particularly with the partially or completely saturated portion 152 of the MOF 104. Accordingly, in such examples, the regeneration stream 182 does not physically contact the MOF 104. Nevertheless, the regeneration stream 182 provides thermal energy to the partially or completely saturated portion 152 of the MOF 104, resulting in the moisture adsorbed on the MOF 104 to be released, and thus regenerating the MOF 104 to form the partially or completely unsaturated portion 150 of the MOF 104.

After regeneration of the MOF 104, the air and the moisture removed from the partially or completely saturated portion 152 of the MOF 104 are expelled outside of the air conditioner system 100 in the exhaust stream 184 into, for example, the exterior 190 of the structure. The exhaust stream 184 may include at least some of the air contacted with the partially or completely saturated portion 152 of the MOF 104.

Figure 2:
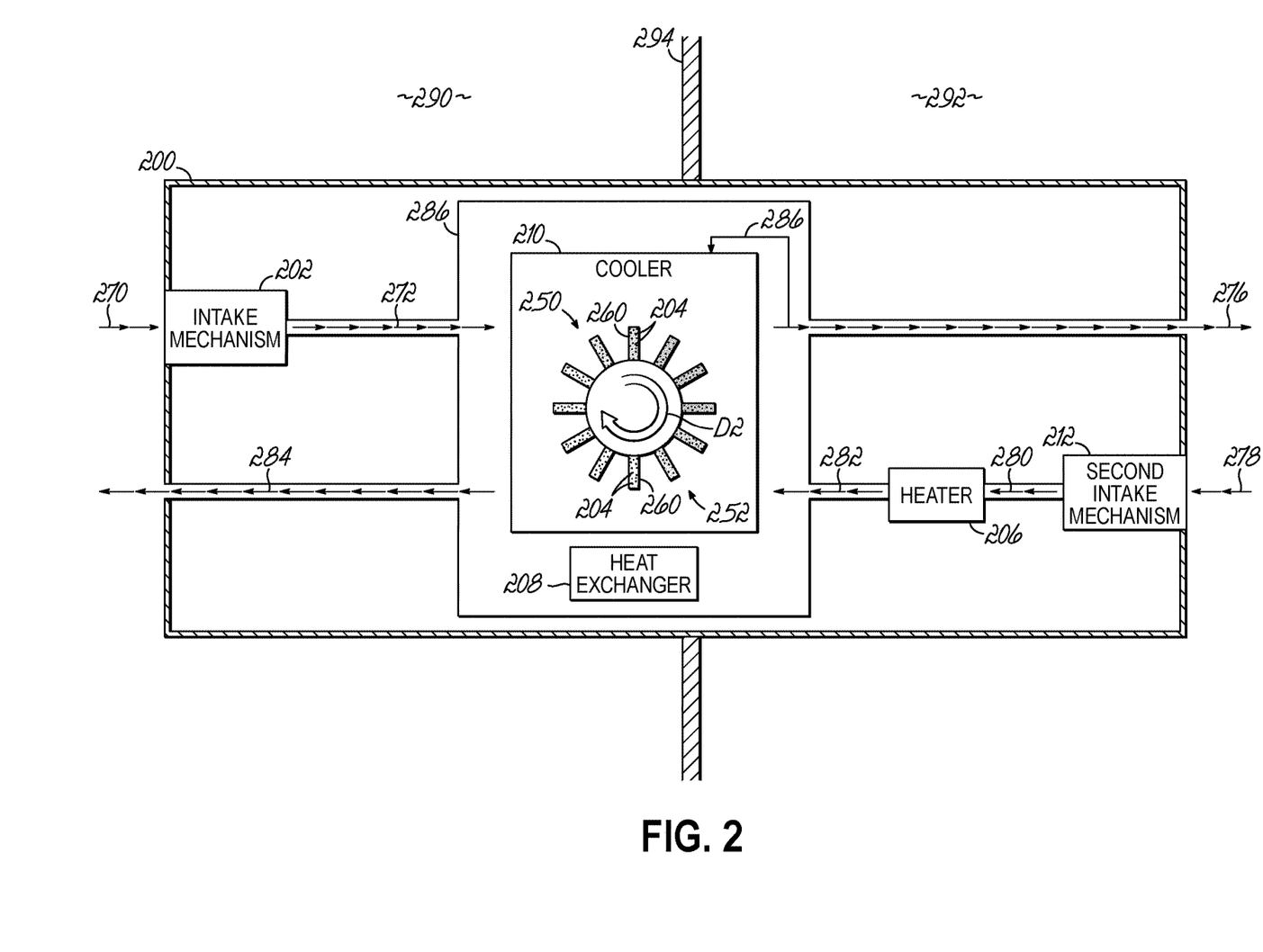
FIG. 2 illustrates a schematic of another example of an air conditioner system.

FIG. 2 illustrates another schematic of an example of an air conditioner system 200. The description of FIG. 2 is similar to the description of FIG. 1, except that FIG. 2 shows an indirect evaporative cooler 210 housed within a module 286 with a metal organic frameworks ("MOFs") 204 distributed within a membrane 260. The system 200 includes a first intake mechanism 202, the MOF 204, a heater 206, a heat exchanger 208, and a second intake mechanism 212. The system 200 may further include the indirect evaporative cooler 210. The membrane 260 and MOF 204 may together form a MOF-based dehumidifier. The indirect evaporative cooler 210 may be substituted for a vapor-compression device that works in conjunction with the MOF-based dehumidifier and still be within the scope of the air conditioner system 200. The MOF-based dehumidifier is a non-limiting example of a metal organic frameworks-based heat and mass exchanger discussed throughout the specification. The air conditioner system 200 is shown positioned in a wall 294 of a structure separating an interior 292 of the structure from an exterior 290 of the structure. This arrangement is merely illustrative of a possible position of the air conditioner system 200 and is intended to be non-limiting.

The first intake mechanism 202 is an apparatus, system, or device configured to draw air from the exterior 290 of the structure, the exterior 290 of the structure is located outside of the air conditioner system 200 into the air conditioner system 200. The air may be located outside of a structure that the air conditioner system 200 is positioned, at least partially, within. The first intake mechanism 202 may be, for example, a fan rotatable around an axis. The rotation of the fan may draw or direct air from the exterior 290 of the structure into the air conditioner system 200 for further processing, and form a first air and moisture stream 270. The air drawn into the air conditioner system 200 from the exterior of the air conditioner system 200 includes an amount of moisture.

The first air and moisture stream 270 includes the air and moisture drawn into the air conditioning system 200 by the first intake mechanism 202. The amount of air and moisture included in the first air and moisture stream 270 results in the first air and moisture stream 270 having a relative humidity.

The first air and moisture stream 270 is drawn into the air conditioner system 200 by the first intake mechanism 202 to form the first intake air stream 272 included within the air conditioner system 200. The air and moisture included in the first intake air stream 272 is subjected to further processing inside the air conditioner system 200. For example, the air and moisture included in the first intake air stream 272 is contacted with the MOFs 204 distributed within the membrane 260. Moisture included in the first intake air stream 272 is adsorbed onto unsaturated metal sites located on a surface of the MOFs 204. The MOFs 204 included in the air conditioner system 200 includes a partially or completely unsaturated portion 250 and a partially or completely saturated portion 252. Alternatively or in addition, a first portion of the MOFs 204 may be partially or completely unsaturated while simultaneously a second portion of the MOFs 204 may be partially or completely saturated. During operation of the air conditioner system 200, the air and moisture included in the first intake air stream 272 is contacted with the partially or completely unsaturated portion 250 of the MOFs 204. The partially or completely unsaturated portion 250 of the MOFs 204 adsorbs an amount of the moisture included in the first intake air stream 272 resulting in the partially or completely unsaturated portion 250 of the MOF 204 to become the partially or completely saturated portion 252 of the MOF 204.

In some examples, as shown in FIG. 2, the MOFs 204 may be distributed on a membrane, and the membrane may be located on a rotatable apparatus such as a wheel. The rotatable apparatus may rotate in a direction D2 around an axis. The rotation of the rotatable apparatus allows the least saturated portion of the partially or completely unsaturated portion 250 of the MOFs 204, distributed within the membrane 260, to be exposed to the first intake air stream 272 prior to other portions of the partially or completely unsaturated portion 250 of the MOFs 204. As the first intake air stream 272 travels through the MOFs 204, the MOFs 204 becomes further saturated with moisture as the MOFs 204 adsorbs moisture from the first intake air stream 272, and the MOFs 204 rotates in the direction D2. Eventually, the partially or completely unsaturated portion 250 of the MOFs 204 becomes partially or completely saturated thus forming the partially or completely saturated portion 252 of the MOFs 204, at which time the partially or completely saturated portion 252 of the MOFs 204 may be exposed to a regeneration stream 282 described below.

As a result of the adsorption of the amount of moisture from the first intake air stream 272 by the MOFs 204, the air and moisture not adsorbed by the MOFs 204 forms a process stream 276. The process stream 276 has a lower relative humidity than the first intake air stream 272. The air and any moisture in the process stream 276 is then carried on inside the air conditioner system 200 for further processing or for expulsion from the air conditioner system 200 into the interior of the structure or space to be air conditioned.

The MOFs 204 are not necessarily limited to adsorbing only moisture from the first intake air stream 272. For example, the MOFs 204 may adsorb contaminants such as formaldehyde that may be present in the air drawn into the air conditioner system 200. The MOFs 204 has an affinity for water or other polar molecules. The affinity for water or other polar molecules may result from a number of mechanisms, such as, strong chemisorptive interactions with coordinatively unsaturated metal sites. Other common molecules such as nitrogen gas, oxygen gas, and carbon dioxide, for example, typically interact much more weakly at the unsaturated metal sites than water, other polar molecules, or contaminants. Alternatively or in addition, the MOF 204 affinity for water may result from physisorptive interactions with organic linkers or metal secondary building units. The MOFs 204 may include polar functional groups such as amines, hydroxyls, sulfoxides, etc., the presence of which may increase the hydrophilicity of the MOF 204 by, for example, promoting water clustering at the unsaturated metal sites. Promotion of water clusters at unsaturated metal sites on the MOFs 204 increases adsorption of the MOF 204 at least by increasing the probability of water molecules being adsorbed at an unsaturated metal site. Alternatively or in addition, the MOFs 204 may include a pore diameter of 2 nm or less, or alternatively, less than about 2 nm. Materials with pores smaller than this diameter will only accommodate water clusters, while larger pore diameters will result in clustering and capillary condensation. Capillary condensation is usually undesirable as it leads to hysteresis in the adsorption/desorption isotherms.

The MOFs 204 may include a variety of suitable materials such that the MOFs 204 is configured to both adsorb the amount of moisture from the first intake air stream 272 and is configured to be regenerated at temperatures of between 75° C. and 90° C., inclusively. For example, the MOFs 204 may include: (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I(Zn/Co), having formula $Zn_xCo_{5-x}Cl_4(BTDD)_3$, where x is 2 or 3, (4) $Co_2Cl_2(BTDD)$, having formula $Co_2Cl_2(BTDD)$, (5) CAU-10 having formula $Al(OH)(mBDC)$, (6) MOF-841, having formula $Zr_6O_4(OH)_4(MTB)_2(HCO_2)(H_2O)_2$, (7) MIL-68-$NH_2$, having formula $M(OH)(BDC-NH_2)$, or combinations thereof, where BDC can be either 1,3-benzenedicarboxylate or 1,4-benzenedicarboxylate, BTDD is bis(1,2,3-triazolo[4,5-b],[40, 50-i])dibenzo[1,4]dioxin, MTB is 4,4',4'',4'''-Methanetetrayltetrabenzoate, BDC-$NH_2$ is 2-amino-1,4-benzenedicarboxylate, and M is aluminum, gallium, indium, or iron.

In some examples, the MOFs 204 has a water adsorption capacity of more than or equal to 100 percent by weight. Alternatively or in addition, in some examples, the MOFs 204 include a plurality of particles having a particle size of less than 1 micron. The MOF particles 204 may include bonding sites at which the moisture from the first intake air stream adsorb to.

The membrane 260 is a polymer membrane configured to hold the MOFs 204 in place during operation of the air conditioner system 200. Suitable polymers for the membrane may include a dispersion of nanoparticles of thermally conductive metals in a water vapor barrier, a dispersion of thermally conductive carbon-containing nanoparticles or nanosheets in a water vapor barrier, thermally conductive polymers, and blends thereof. The dispersion of nanoparticles of thermally conductive metals may include, for example, copper, nickel, zinc, aluminum, iron and the like in water vapor barriers including polyethylene (PE), polypropylene (PP), polyvinylidene difluoride (PVDF), polyacrylonitrile (PAN), fluorinated polymer and copolymer, polystyrene (PS), polyester/polyethylene terephthalate (PET), polyurethane (PU), polysulfone (PSF), polyethersulfone (PES), polyimide (PI), polycarbonate (PC), and polyvinyl chloride (PVC). The dispersion of thermally conductive carbon-containing nanoparticles or nanosheets may include, for example, carbon black, carbon nanotubes, graphene, graphene oxide and the like in water vapor barriers including polyethylene (PE), polypropylene (PP), polyvinylidene difluoride (PVDF), polyacrylonitrile (PAN), fluorinated polymer and copolymer, polystyrene (PS), polyester/polyethylene terephthalate (PET), polyurethane (PU), polysulfone (PSF), polyethersulfone (PES), polyimide (PI), polycarbonate (PC), and polyvinyl chloride (PVC). The thermally conductive polymers may include, for example, polyaniline, polyacetylene, polyphenylene vinylene, polypyrrole, polythiophene, poly(3,4-ethylenedioxythiophene), polyphenylene sulfide, polycarbazole, polyindole, polyazepine, poly (fluorene), polypyrene, polyazulene, and polynaphthalene. The thickness of the membrane 260 is in a range of between 0.04 microns and 400 microns, inclusively, preferably between 0.4 microns and 40 microns, inclusively, and most preferably between 4 microns and 10 microns, inclusively. The membrane 260 may be coupled to the rotatable apparatus, such as the wheel, as shown in FIG. 2. The membrane 260 rotates with the rotatable apparatus in direction D2, carrying the MOFs 204 along in the same direction D2. The membranes 260 are rolled into a spiral wound module to better contact the process air and moisture moving through the air conditioner system 200.

In some examples, after the air and moisture included in the first air intake stream 272 is cooled by the indirect evaporative cooler 210. The indirect evaporative cooler 210 is configured to cool a temperature of the air to a predetermined desired temperature. The indirect evaporative cooler 210 may indirectly bring the process air into thermal communication with an amount of an evaporative fluid. For example, the air may be inside a bladder or shell with the evaporative fluid on an outer surface of the bladder or shell. The evaporative fluid is at a lower temperature than the air included in the first air intake stream 272 coming into the bladder or shell. The air in the bladder or shell contacts the inner surface of the bladder or shell, prompting thermal energy in the first air intake stream 272 to be transferred through the bladder or shell and causing the evaporative fluid on the outer surface of the bladder or shell to evaporate. Thus, energy is removed from the first air intake stream 272 inside the bladder or shell, and the first air intake stream 272 inside the bladder or shell is cooled. In such a case, the indirect evaporative cooler 210 is considered "indirect" at least because the first air intake stream 272 does not directly contact or mix with the evaporative fluid, and the evaporative fluid does not contaminate or mix with the first air intake stream 272. As a result only a thermal exchange between the first air intake stream 272 and the evaporative fluid occurs. The amount of energy transferred from the first air intake stream 272 to the evaporative fluid is sufficient to result in a temperature of the first air intake stream 272 being reduced to a predetermined temperature, and forming the process stream 276.

The process stream 276 includes the air and the unabsorbed moisture included in the first intake air stream 272, but the process stream 276 has a lower temperature than the first intake air stream 272 at least as a result of the cooler 210 operations, for example thermal energy being transferred from the first intake air stream 272 into the evaporative fluid. The temperature of the process stream 276 may be predetermined, or set by a user operating the air conditioner system 200. The process stream 276 is discharged into the interior 292 of the structure. Alternatively, in some examples, the air conditioner system 200 does not include the cooler 210 (not shown), the process stream 276 may be discharged into the interior 292 of the structure at a predetermined temperature.

Figure 3A:
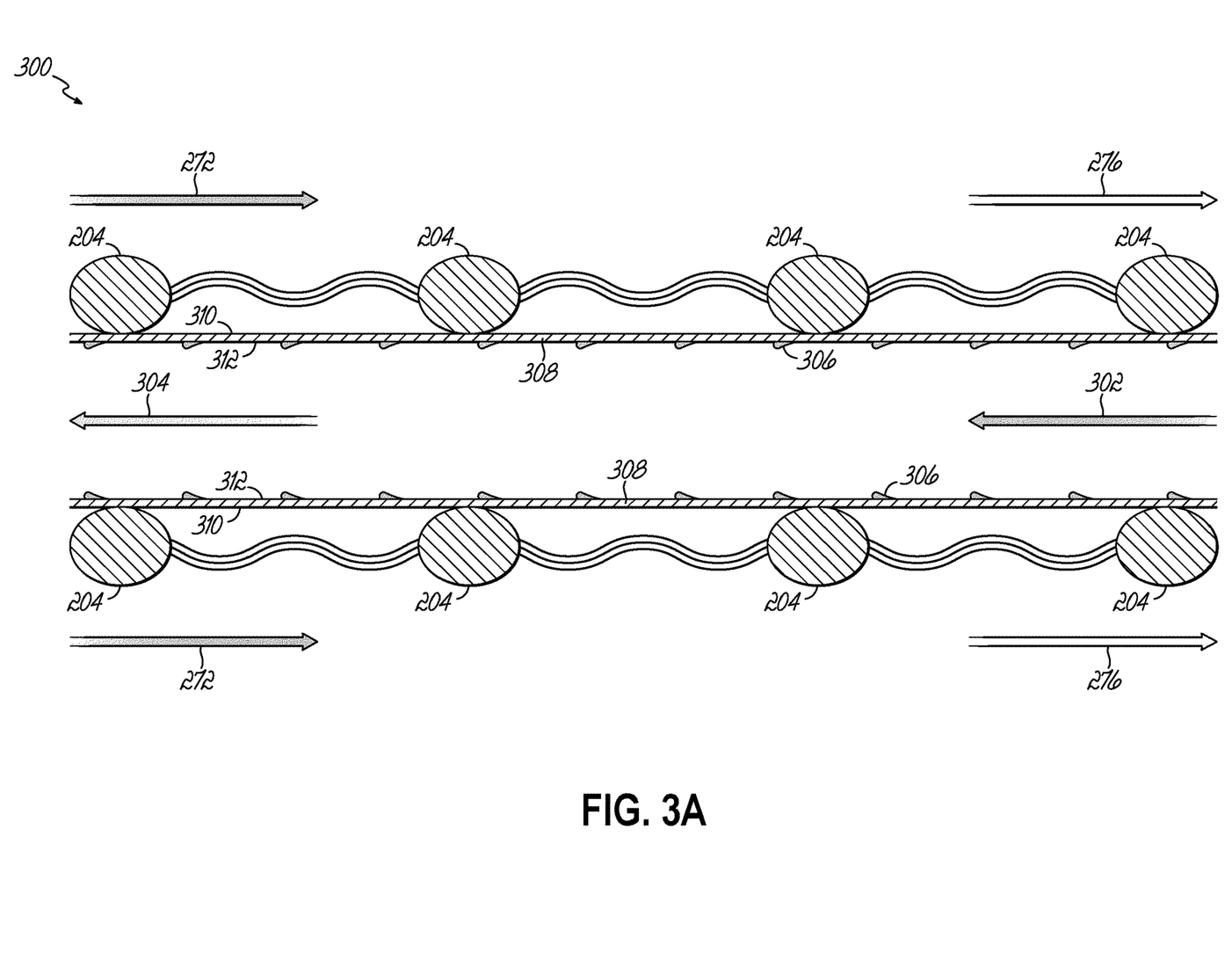
FIG. 3A illustrates a schematic of an example of an integrated MOF-based membrane dehumidifier and indirect evaporative cooler that may be used to simultaneously cool air.
Figure 3B:
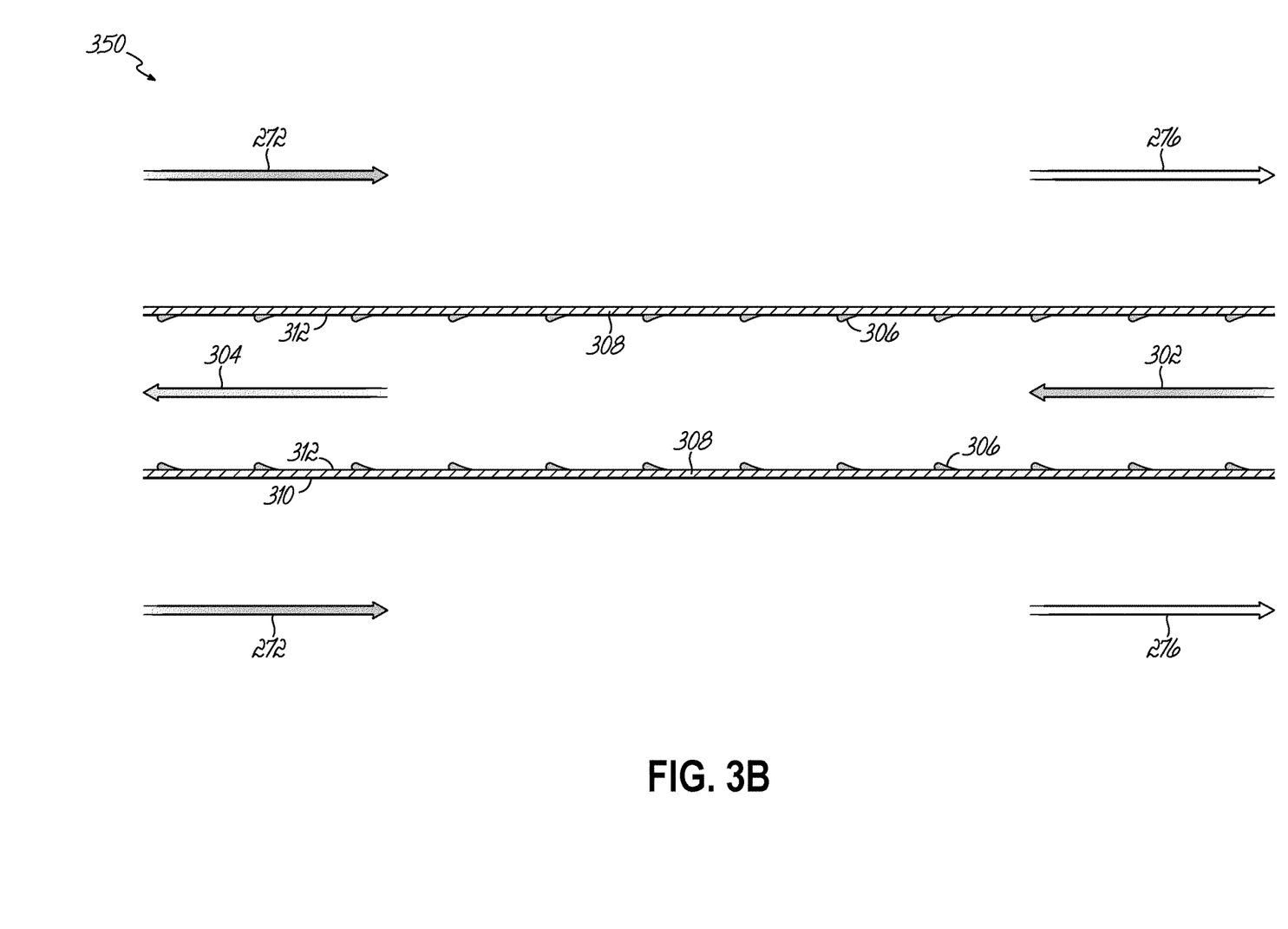
FIG. 3B illustrates a schematic of an example of an indirect evaporative cooler that may be used to cool a process air stream.

In some examples, as shown in FIG. 2, the indirect evaporative cooler 210 and the MOFs 204 distributed within the membrane 260 are housed within a common module 286. The module 286 is in fluid communication with the first air intake stream 272. The module 286 promotes thermal communication between the indirect evaporative cooler 210, the first air intake stream 272, and the MOFs 204. In some examples, the indirect evaporative cooler 210, the first intake stream 272 and the MOF 204 are all proximately closer to each other within the module 286 than each would be outside of the module 286. Alternatively or in addition, the cooler 210 may provide a cooling effect directly to the MOFs 204, thus increasing the MOFs' 204 adsorption capacity and increasing the efficacy of the air conditioner system 200. The indirect evaporative cooler 210 may cool both the MOFs 204 and the process air in the module 286. The cooling of the process air and the MOFs 204 may occur simultaneously, as shown in FIG. 3A, or sequentially. FIG. 3B shows an example of an indirect evaporative cooler 300 that cools a process air stream without simultaneously cooling the MOF. The cooling of the MOFs 204 results in an increased adsorption capability of the MOFs 204. For example, at least because the MOFs 204 is cooled by the indirect evaporative cooler 210, the equilibrium vapor pressure is reduced, resulting in the MOFs 204 being more potent for dehumidification. The indirect evaporative cooler 210 in the module 286 also cools the process air included in the first air intake stream 272 to a predetermined temperature. The cooling of the MOFs 204 and the cooling of the process air occur in alternating channels of the indirect evaporative cooler 210.

Once the air included in the process stream 276 reaches the predetermined temperature, the process stream 276 is dispensed into the interior 292 of the structure to be air conditioned, such as a room of a structure. The air conditioner system 200 includes the second intake mechanism 212. The second intake mechanism 212 is an apparatus, system, or device configured to draw air from outside of the air conditioner system 200, for example the interior 292 of the structure, into the air conditioner system 200. In some examples, the air may be inside a space or room that the air conditioner system 200 is positioned within. Alternatively or in addition, the air drawn in by the second intake mechanism 212 may be from outside the space or room in which the air conditioner system 200 is placed. The second intake mechanism 212 may be, for example, a fan rotatable around an axis. The axis of rotation of the second intake mechanism 212 may be a same or different axis of rotation than the first intake mechanism 202. The rotation of the fan may draw or direct air from the interior 292 of the structure into the air conditioner system 200 for further processing, and form a second air and moisture stream 278.

In addition, a portion of the process steam 276 is siphoned away to form a cooling stream 286. The cooling stream 286 is fed into a wet side of the cooler 210 to assist with cooling the dry stream 274. The cooling stream 286 may be combined with air from outside the air conditioner system 200 to form a cooling stream 302, discussed below in relation to FIGS. 3A and 3B. At least because the air included in the cooling stream 286 has already been dehumidified by the MOF 204, the air in the cooling stream 286 has a low relative humidity and thus encourages evaporation of an evaporative fluid film 306, discussed below in relation to FIGS. 3A and 3B, and assists in the cooler's 210 performance.

In some examples, the second air and moisture stream 278 includes the air and moisture drawn into the air conditioning system 200 by the second intake mechanism 212 is taken from the interior 292 of the structure. Alternatively or in addition, the second air and moisture stream 278 includes an amount of air and moisture drawn into the air conditioner system 200 from the exterior 290 of the structure by the second intake mechanism 212 (this arrangement is not shown).

The second air and moisture stream 278 is drawn into the air conditioner system 200 by the second intake mechanism 212 to form the second intake air stream 280 included within the air conditioner system 200. The air and moisture included in the second intake air stream 280 is subjected to further processing inside the air conditioner system 200. For example, the air included in the second intake air stream 280 is heated by the heater 206. The heater 206 may be a solar heater. Alternatively or in addition, the heater 206 may be configured to raise the temperature of the air drawn into the air conditioner system 200 to between 75° C. and 90° C., inclusively. The heater 206 may be the only source of heat included in the air conditioner system 200. The heater 206 supplies thermal energy to the air in the second intake air stream 280. At least in examples where the heater 206 is a solar heater, the heater 206 may covert solar energy into thermal energy and supply the air in the second intake air stream 280 with thermal energy. In some examples, the solar heater 206 is the only heat source included in the air conditioner 200.

At least as a result of the heater 206 supplying the air in the second intake air stream 280 with thermal energy, a temperature of the air in the second intake air stream 280 increases, and forms a regeneration stream 282. The temperature of the air in the regeneration stream 282 may be between 75° C. and 90° C., inclusively. At such a temperature, the air included in the regeneration stream 282 is brought into contact with the partially or completely saturated portion 252 of the MOFs 204. The air included in the regeneration stream 282 regenerates the partially or completely saturated portion 252 of the MOFs 204 to form the partially or completely unsaturated portion 250 of the MOFs 204. That is to state, the water present at the metal sites on the MOFs 204 are released from the MOFs 204 and absorbed into the regeneration stream 282 to form an exhaust stream 184, and thus the metal sites on the MOFs 204 are available to adsorb molecules, such as water or contaminants, present in any future air or moisture drawn into the air conditioner system 200, by, for example, the first intake mechanism 202.

In some examples, the regeneration stream 282 is supplied to the heat exchanger 208. The heat exchanger 208 provides a physical barrier between the regeneration stream 282 and the MOFs 204. However, the heat exchanger 208 permits the regeneration stream 282 to thermally communicate with the MOFs 204, particularly with the partially or completely saturated portion 252 of the MOFs 204. Accordingly, in such examples, the regeneration stream 282 does not physically contact the MOFs 204. Nevertheless, the regeneration stream 282 provides thermal energy to the partially or completely saturated portion 252 of the MOFs 204, resulting in the moisture adsorbed on the MOFs 204 to be released, and thus regenerating the partially or completely unsaturated portion 250 of the MOFs 204.

After regeneration of the MOFs 204, the air and the moisture removed from the partially or completely saturated portion 252 of the MOFs 204 are expelled outside of the air conditioner system 200 in the exhaust stream 284 into, for example, the exterior 290 of the structure. The exhaust stream 284 may include at least some of the air contacted with the partially or completely saturated portion 252 of the MOFs 204.

FIG. 3A illustrates a first channel 300 of an example combined indirect evaporative cooler 210 and MOF-based membrane dehumidifier that may be utilized in, for example, the air conditioner system 200. The indirect evaporative cooler 210 may be utilized in the air conditioner system 100 as well, however, in the interest of brevity, only the utility of the indirect evaporative cooler 210 in conjunction with the air conditioner system 200 is described herein. The indirect evaporative cooler 210 may assist the MOFs 204 in adsorbing moisture from the first intake air stream 272 at least by cooling the MOFs 204, thus increasing the MOFs' 204 adsorption capacity. The first channel 300 includes, for example, the MOFs 204, the first air intake stream 272, the process stream 276, a cooling stream 302, a humid stream 304, an evaporative fluid film 306, and a barrier membrane 308.

The first channel 300 includes the MOFs 204 positioned on a first side 310 of the barrier membrane 308 and the MOFs 204 in thermal communication with the evaporative fluid film 306. The evaporative fluid film 306 flows on a second side 312 of the barrier membrane 308, and the second side 312 is opposite the first side 310, as shown in FIG. 3A.

The cooling stream 302 is a stream of air or other absorptive fluid configured to absorb the evaporative fluid film from a surface of the barrier membrane 308. In some examples, the cooling stream 302 includes air. The cooling stream 302 flows on the second side 312 of the barrier membrane 308 and absorbs the evaporative fluid film from the barrier membrane 308.

The evaporative fluid film 306 is a film of fluid that flows along the surface of the barrier membrane 308 on the second side 312 of the barrier membrane 308. The evaporative fluid film 306 is in thermal communication with the MOFs 204 located on the first side 310 of the barrier membrane 308. A temperature gradient may exist from the MOFs 204 toward the evaporative fluid film 306 across the barrier membrane 308 at least in part due to the evaporative fluid film 306 having a lower temperature than the MOFs 204. At least in part due to the temperature gradient from the MOFs 204 toward the evaporative fluid film 306, thermal energy is transferred from the MOFs 204 into the evaporative fluid film 306. The thermal energy transferred in this way assists in evaporating the evaporative fluid film 306 into the chilling stream 302, resulting in the humid stream 304. The humid stream 304 is the combination of the evaporated evaporative fluid film 306 and the cooling stream 302.

Alternatively or in addition, the first air intake stream 272 may be in thermal communication with the evaporative fluid film 306. The first air intake stream 272 may flow on the first side 310 of the barrier membrane 308. The first air intake stream 272 may contact the barrier membrane 308 during operation of the air conditioner system 200. In some examples, a temperature gradient is present from the first air intake stream 272 toward the evaporative fluid film 306, prompting thermal energy transfer from the first air intake stream 272 to the evaporative fluid film 306, across the barrier membrane 308. The thermal energy transfer results in a temperature drop in the first air intake stream 272. The temperature drop, combined with adsorption of moisture from the first air intake stream 272 into the MOFs 204, results in the process stream 276. The process stream 276 may then be dispensed into the interior 194 of the structure, as described in reference to FIG. 2.

The evaporative fluid film 306 may include water or other fluid configured to be evaporated due to the thermal energy transferred from the MOFs 204 across the barrier membrane 308 into the evaporative fluid film 306. Examples of suitable evaporative fluid films 306 include, but are not limited to, water and glycerol. The evaporative fluid film 306 may be harvested from an outside source of fluid. Alternatively or in addition, the evaporative fluid film 306 may be a recycle stream within the air conditioner system 200.

Although the barrier membrane 308 is thermally permeable, the barrier membrane 308 may not be mass permeable. That is, the mass flux across the barrier membrane 308 from the first side 310 to the second side 312 is about zero or exactly zero. Therefore, neither moisture from the MOFs 204 nor fluid included in the evaporative fluid film permeates the barrier membrane 308 from the first side 310 to the second side 312 or vice versa.

At least because thermal energy is drawn away from the MOFs 204 by the evaporative fluid film 306, the MOFs' 204 adsorption capacity is increased, thus the MOFs 204 are capable of adsorbing a greater amount of moisture from the first intake air stream 272. As explained above, the MOF 204 may include: (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I(Zn/Co), having formula $Zn_xCo_{5-x}Cl_4(BTDD)_3$, where x is 2 or 3, (4) $Co_2Cl_2(BTDD)$, having formula $Co_2Cl_2(BTDD)$, (5) CAU-10 having formula $Al(OH)(mBDC)$, (6) MOF-841, having formula $Zr_6O_4(OH)_4(MTB)_2(HCO_2)(H_2O)_2$, (7) MIL-68-$NH_2$, having formula $M(OH)(BDC-NH_2)$, or combinations thereof, where BDC can be either 1,3-benzenedicarboxylate or 1,4-benzenedicarboxylate, BTDD is bis(1,2,3-triazolo[4,5-b],[40,50-i])dibenzo[1,4]dioxin, MTB is 4,4',4'',4'''-Methanetetrayltetrabenzoate, BDC-$NH_2$ is 2-amino-1,4-benzenedicarboxylate, and M is aluminum, gallium, indium, or iron, (8) or combinations thereof. These potential MOF 204 and MOF 104 materials have $H_2O$ adsorption capacities. For example, (1) MIL-101 (Cr) having formula $Cr_3(O)(OH)(BDC)_3(H_2O)_2$, has an $H_2O$ adsorption capacity of between 0.8 and 1, inclusively, grams of $H_2O$ adsorbed per gram of metal organic frameworks at 20° C. and a relative humidity of 55%; (2) MFU-4I(Zn) having formula $Zn_5Cl_4(BTDD)_3$, has an $H_2O$ adsorption capacity of or about 1.04 grams of $H_2O$ adsorbed per gram of metal organic frameworks at 25° C. and a relative humidity of 70%; (3) MFU-4I(Zn/Co), having formula $Zn_xCo_{5-x}Cl_4(BTDD)_3$, where x is 2 or 3, has an $H_2O$ adsorption capacity of between 0.95 and 1.11, inclusively, grams of $H_2O$ adsorbed per gram of metal organic frameworks at 25° C. and a relative humidity of between 40% and 50%, inclusively; (4) $Co_2Cl_2(BTDD)$, having formula $Co_2Cl_2(BTDD)$, has an $H_2O$ adsorption capacity of or about 0.82 grams of $H_2O$ adsorbed per gram of metal organic frameworks at 25° C. and a relative humidity of 45%; (5) CAU-10 having formula $Al(OH)(mBDC)$, has an $H_2O$ adsorption capacity of between 0.25 and 0.35, inclusively, grams of $H_2O$ adsorbed per gram of metal organic frameworks at 25° C. and a relative humidity of 30%; (6) MOF-841, having formula $Zr_6O_4(OH)_4(MTB)_2(HCO_2)(H_2O)_2$, has an $H_2O$ adsorption capacity of or about 0.3 grams of $H_2O$ adsorbed per gram of metal organic frameworks at 25° C. and a relative humidity of 50%; and (7) MIL-68-$NH_2$, having formula $M(OH)$ (BDC-$NH_2$) has an $H_2O$ adsorption capacity of or about 0.3 grams of $H_2O$ adsorbed per gram of metal organic frameworks at 25° C. and a relative humidity of 50%.

In another embodiment, the process air is cooled sequentially from the adsorption of moisture from the first intake stream 272. For example, before or after the air and moisture in the first intake stream 272 is contacted with the MOFs 204, the indirect evaporative cooler may cool the air and moisture in the first intake stream 272. FIG. 3B illustrates a second channel 350 of the example indirect evaporative cooler 210 that may be utilized in, for example, the air conditioner system 200. The indirect evaporative cooler 210 may be utilized in the air conditioner system 100 as well, however, in the interest of brevity, only the utility of the indirect evaporative cooler 300 in conjunction with the air conditioner system 200 is described herein. The second channel 350, shown in FIG. 3B, cools the process air. The cooling of the process air may occur simultaneously with the cooling of the MOF 204, as shown in FIG. 3A. Alternatively or in addition, the second channel 350 may be utilized to cool the process air to, for example, a predetermined temperature in the absence of the MOF 204. The second channel 350 in the indirect evaporative cooler 210 may assist in cooling the process air in the first intake stream 272 to a predetermined temperature, and thus form the process stream 276. The second channel 350 of the indirect evaporative cooler 210 includes, for example, the first air intake stream 272, the process stream 276, a chilling stream 302, a humid stream 304, an evaporative fluid film 306, and a barrier membrane 308.

The chilling stream 302 is a stream of air or other absorptive fluid configured to absorb the evaporative fluid film from a surface of the barrier membrane 308. In some examples, the chilling stream 302 includes air. The chilling stream 302 flows on the second side 312 of the barrier membrane 308 and absorbs the evaporative fluid film 306 from the barrier membrane 308.

The first air intake stream 272 may be in thermal communication with the evaporative fluid film 306. The first air intake stream 272 may flow on the first side 310 of the barrier membrane 308. The first air intake stream 272 may contact the barrier membrane 308 during operation of the air conditioner system 200. In some examples, a temperature gradient is present from the first air intake stream 272 toward the evaporative fluid film 306, prompting thermal energy transfer from the first air intake stream 272 to the evaporative fluid film 306, across the barrier membrane 308. The thermal energy transfer results in a temperature drop in the first air intake stream 272. The temperature drop, results in the process stream 276. The process stream 276 may then be dispensed into the interior 194 of the structure, as described in reference to FIG. 2.

The evaporative fluid film 306 may include water or other fluid configured to be evaporated due to the thermal energy transferred from the MOF 204 across the barrier membrane 308 into the evaporative fluid film 306. Examples of suitable evaporative fluid films 306 include, but are not limited to, water and glycerol. The evaporative fluid film 306 may be harvested from an outside source of fluid. Alternatively or in addition, the evaporative fluid film 306 may be a recycle stream within the air conditioner system 200.

Although the barrier membrane 308 is thermally permeable, the barrier membrane 308 may not be mass permeable. That is, the mass flux across the barrier membrane 308 from the first side 310 to the second side 312 is about zero or exactly zero. Therefore, fluid included in the evaporative fluid film does not permeate the barrier membrane 308 from the first side 310 to the second side 312 or vice versa.

At least because thermal energy is drawn away from the first intake stream 272 by the evaporative fluid film 306, the first intake stream's 272 temperature decreases, for example to a predetermined temperature, thus resulting in the process stream 276.

Figure 4:
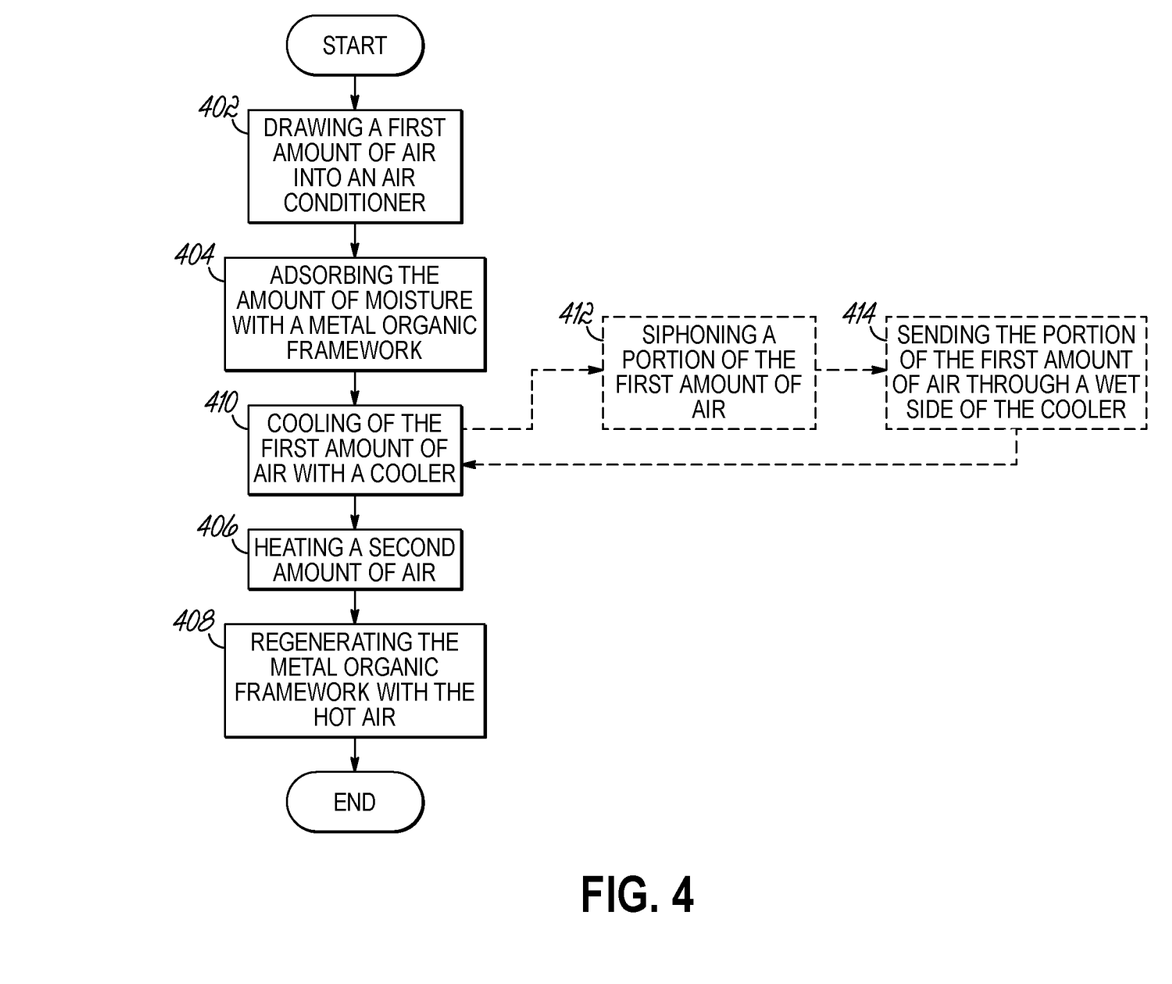
FIG. 4 illustrates a flow chart for a method of air conditioning.

FIG. 4 illustrates a flowchart for a method 400 of air conditioning a space. The flowchart illustrated in FIG. 4 is an illustration of a method of operation of the air conditioner systems 100, 200 shown in FIGS. 1 and 2. The method includes drawing 402 a first amount of air into an interior of an air conditioner from an exterior of the air conditioner, the first amount of air including an amount of moisture. The method further includes adsorbing 404 the amount of moisture into an approximately unsaturated MOFs to form partially saturated MOFs. The method further includes heating 406 a second amount of air with a solar heater to form an amount of hot air, wherein the hot air has a temperature greater than a temperature of the second amount of air. The method further includes regenerating 408 the partially saturated MOFs to form partially unsaturated MOFs by removing the amount of moisture by contacting the amount of hot air with the partially saturated metal organic framework.

Drawing 402 the first amount of air into the interior of the air conditioner includes drawing air from the exterior of the air conditioner into the air conditioner. Drawing 402 the first amount of air into the air conditioner may be accomplished in a variety of ways, for example with an intake fan or other mechanism. During operation of the air conditioner, the intake mechanism may direct air from the exterior of the air conditioner into the interior of the air conditioner for further processing.

The method further includes adsorbing 404 the amount of moisture into approximately unsaturated metal organic frameworks to form partially saturated MOFs. Moisture drawn into the air conditioner is adsorbed by the MOFs. The MOFs may be distributed on a surface of a membrane. The adsorption of the moisture onto the MOFs is adiabatic, and the heat of adsorption is transferred from the MOFs into the air stream from which the moisture was adsorbed. Thus, the air stream may increase in temperature as a result of moisture being adsorbed therefrom.

The method further includes, after the amount of moisture is adsorbed from the air stream, cooling 410 the first amount of air using a cooler. The cooler may be an indirect evaporative cooler, or another suitable cooler such as a vapor compression cooler. Alternatively or in addition, the MOFs may be cooled using a cooler to provide improved adsorption capacity. In an example where the cooler is an indirect evaporative cooler, cooling 410 the first amount of air may be cooled by contacting the side of the indirect evaporative cooler including the evaporative film with an amount of working air. The working air may include air brought into the air conditioner from outside of the air conditioner. Alternatively or in addition, the working air may include a portion of air having already been through the cooler. For example, optionally, the method may further include siphoning 412 air that has already been cooled by the cooler. The method may further include sending 414 the siphoned air to a working air stream, such as the cooling stream 302, for example, and eventually to a wet side of the cooler to assist with cooling air brought into the cooler. After the working air stream has been used, for example to evaporate the evaporative film The method further includes heating 406 a second amount of air with a solar heater to form an amount of hot air, wherein the hot air has a temperature greater than a temperature of the second amount of air. In some examples, the temperature of the hot air is less than or equal to 90 degrees Celsius. In some examples, the solar heater is the only heat source providing heat to the air conditioner.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. An air conditioner comprising:
   an intake mechanism configured to draw into the air conditioner a first amount of air and an amount of moisture from an exterior of the air conditioner;
   a plurality of metal organic frameworks distributed within a polymer membrane, the metal organic frameworks in fluid communication with the intake mechanism, the metal organic frameworks configured to adsorb the amount of moisture from the first amount of air;
   an indirect evaporative cooler in fluid communication with the metal organic frameworks and configured to cool the first amount of air; and
   a solar heater configured to heat a second amount of air, wherein the second amount of air is configured to regenerate the metal organic frameworks.
2. The air conditioner of aspect 1, wherein the metal organic frameworks have a water adsorption capacity of more than 50 percent by weight.
3. The air conditioner of any of aspects 1 to 2, wherein the metal organic frameworks comprise a plurality of particles having a particle size of less than 1 micron.
4. The air conditioner of any of aspects 1 to 3, wherein the solar heater is an only heat source comprised in the air conditioner.
5. The air conditioner of any of aspects 1 to 4, wherein the intake mechanism is a first intake mechanism, and wherein the air conditioner comprises a second intake mechanism configured to draw into the air conditioner the second amount of air from the exterior of the air conditioner.
6. The air conditioner of any of aspects 1 to 5, wherein the metal organic frameworks are selected from the group consisting of (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I(Zn/Co), having formula $Zn_xCo_{5-x}Cl_4(BTDD)_3$, where x is 2 or 3, (4) $Co_2Cl_2$(BTDD), having formula $Co_2Cl_2$(BTDD), (5) CAU-10 having formula Al(OH)(mBDC), (6) MOF-841, having formula $Zr_6O_4(OH)_4(MTB)_2(HCO_2)(H_2O)_2$, (7) MIL-68-NH2, having formula M(OH)(BDC-NH2), or combinations thereof, where BDC can be either 1,3- benzenedicarboxylate or 1,4-benzenedicarboxylate, BTDD is bis(1,2,3-triazolo[4,5-b],[40,50-i])dibenzo[1,4]dioxin, MTB is 4,4',4'',4'''-Methanetetrayltetrabenzoate, BDC-NH$_2$ is 2-amino-1,4-benzenedicarboxylate, and M is aluminum, gallium, indium, or iron, (8) or combinations thereof.

7. An air conditioner comprising, an intake mechanism configured to draw into the air conditioner a first amount of air and an amount of moisture from an exterior of the air conditioner;

a module in fluid communication with the intake mechanism, the module comprising:

a plurality of metal organic frameworks, the metal organic frameworks configured to adsorb the amount of moisture from the first amount of air; and a cooler configured to cool the first amount of air; and a solar heater configured to heat a second amount of air, wherein the second amount of air is configured to regenerate the metal organic frameworks.

8. The air conditioner of aspect 7, wherein the metal organic frameworks have a water adsorption capacity of more than 50 percent by weight.

9. The air conditioner of and of aspects 7 to 8, wherein the metal organic frameworks comprise a plurality of particles having a particle size of less than 1 micron.

10. The air conditioner of and of aspects 7 to 9, wherein the solar heater is an only heat source comprised in the air conditioner.

11. The air conditioner of and of aspects 7 to 10, wherein the intake mechanism is a first intake mechanism, and wherein the air conditioner comprises a second intake mechanism configured to draw into the air conditioner the second amount of air from the exterior of the air conditioner.

12. The air conditioner of and of aspects 7 to 11, wherein the metal organic frameworks are selected from the group consisting of (1) MIL-101 (Cr) having formula Cr3(O)(OH)(BDC)3(H2O)2, (2) MFU-4I(Zn) having formula Zn5Cl4(BTDD)3, (3) MFU-4I(Zn/Co), having formula ZnxCo5-xCl4(BTDD)3, where x is 2 or 3, (4) Co2Cl2(BTDD), having formula Co2Cl2(BTDD), (5) CAU-10 having formula Al(OH)(mBDC), (6) MOF-841, having formula Zr6O4(OH)4(MTB)2(HCO2)(H2O)2, (7) MIL-68-NH2, having formula M(OH)(BDC-NH2), or combinations thereof, where BDC can be either 1,3-benzenedicarboxylate or 1,4-benzenedicarboxylate, BTDD is bis(1,2,3-triazolo[4,5-b],[40,50-i])dibenzo[1,4]dioxin, MTB is 4,4',4'',4'''-Methanetetrayltetrabenzoate, BDC-NH2 is 2-amino-1,4-benzenedicarboxylate, and M is aluminum, gallium, indium, or iron, (8) or combinations thereof.

13. The air conditioner of and of aspects 7 to 12, wherein the indirect evaporative cooler is further configured to cool the metal organic frameworks.

14. A method of air conditioning comprising:

drawing a first amount of air into an interior of an air conditioner from an exterior of the air conditioner, the first amount of air including an amount of moisture;

adsorbing the amount of moisture into a plurality of approximately unsaturated metal organic frameworks to form a plurality of partially saturated metal organic frameworks;

cooling the first amount of air with an indirect evaporative cooler;

heating a second amount of air with a solar heater to form an amount of hot air, wherein the hot air has a temperature greater than a temperature of the second amount of air; and regenerating the partially saturated metal organic frameworks to form the partially unsaturated metal organic frameworks by removing the amount of moisture by contacting the amount of hot air with the partially saturated metal organic frameworks.

15. The method of aspect 14, wherein the temperature of the hot air is less than 90 degrees Celsius.

16. The method of any of aspects 14 to 15, wherein the second amount of air is drawn into the air conditioner from the exterior of the air conditioner.

17. The method of any of aspects 14 to 16, wherein the solar heat is an only heat source comprised in the air conditioner.

18. The method of any of aspects 14 to 17, wherein the approximately unsaturated metal organic frameworks are selected from the group consisting of (1) MIL-101 (Cr) having formula Cr3(O)(OH)(BDC)3(H2O)2, (2) MFU-4I(Zn) having formula Zn5Cl4(BTDD)3, (3) MFU-4I(Zn/Co), having formula ZnxCo5-xCl4 (BTDD)3, where x is 2 or 3, (4) Co2Cl2(BTDD), having formula Co2Cl2(BTDD), (5) CAU-10 having formula Al(OH)(mBDC), (6) MOF-841, having formula Zr6O4(OH)4(MTB)2(HCO2)(H2O)2, (7) MIL-68-NH2, having formula M(OH)(BDC-NH2), or combinations thereof, where BDC can be either 1,3-benzenedicarboxylate or 1,4-benzenedicarboxylate, BTDD is bis(1,2,3-triazolo[4,5-b],[40,50-i])dibenzo[1,4]dioxin, MTB is 4,4',4'',4'''-Methanetetrayltetrabenzoate, BDC-NH$_2$ is 2-amino-1,4-benzenedicarboxylate, and M is aluminum, gallium, indium, or iron, (8) or combinations thereof.

19. The method of any of aspects 14 to 18, wherein the partially saturated metal organic frameworks are selected from the group consisting of (1) MIL-101 (Cr) having formula Cr3(O)(OH)(BDC)3(H2O)2, (2) MFU-4I(Zn) having formula Zn5Cl4(BTDD)3, (3) MFU-4I (Zn/Co), having formula ZnxCo5-xCl4(BTDD)3, where x is 2 or 3, (4) Co2Cl2(BTDD), having formula Co2Cl2(BTDD), (5) CAU-10 having formula Al(OH)(mBDC), (6) MOF-841, having formula Zr6O4(OH)4 (MTB)2(HCO2)(H2O)2, (7) MIL-68-NH2, having formula M(OH)(BDC-NH2), or combinations thereof, where BDC can be either 1,3-benzenedicarboxylate or 1,4-benzenedicarboxylate, BTDD is bis(1,2,3-triazolo [4,5-b],[40,50-i])dibenzo[1,4]dioxin, MTB is 4,4',4'',4'''-Methanetetrayltetrabenzoate, BDC-NH2 is 2-amino-1,4-benzenedicarboxylate, and M is aluminum, gallium, indium, or iron, (8) or combinations thereof.

20. The method of any of aspects 14 to 19 further comprising cooling the partially unsaturated metal organic frameworks with the indirect evaporative cooler.

What is claimed is:

1. An air conditioner comprising:

an intake mechanism configured to draw into the air conditioner a first amount of air and an amount of moisture from an exterior of the air conditioner;

a plurality of metal organic frameworks distributed within a polymer membrane, the metal organic frameworks in fluid communication with the intake mechanism, the metal organic frameworks configured to adsorb the amount of moisture from the first amount of air;

an indirect evaporative cooler in fluid communication with the metal organic frameworks and configured to cool the first amount of air, the indirect evaporative cooler comprising a barrier membrane having a first side and a second side, the first side positioned to contact the first amount of air prior to being cooled, and the second side configured to contact a cooling stream formed from a combination of a third amount of air from outside of the air conditioner system and a portion of the first amount of air that is siphoned from the first amount of air after the first amount of air is cooled, and wherein the cooling stream is fed back into the indirect evaporative cooler; and a solar heater configured to heat a second amount of air, wherein the second amount of air is configured to regenerate the metal organic frameworks.

2. The air conditioner of claim 1, wherein the metal organic frameworks have a water adsorption capacity of more than 50 percent by weight.

3. The air conditioner of claim 1, wherein the metal organic frameworks comprise a plurality of particles having a particle size of less than 1 micron.

4. The air conditioner of claim 1, wherein the solar heater is an only heat source comprised in the air conditioner.

5. The air conditioner of claim 1, wherein the intake mechanism is a first intake mechanism, and wherein the air conditioner comprises a second intake mechanism configured to draw into the air conditioner the second amount of air from the exterior of the air conditioner.

6. The air conditioner of claim 1, wherein the metal organic frameworks are selected from the group consisting of (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I(Zn/Co), having formula $Zn_xCo_{5-x}Cl_4(BTDD)_3$, where x is 2 or 3, (4) $Co_2Cl_2(BTDD)$, having formula $Co_2Cl_2(BTDD)$, (5) CAU-10 having formula Al(OH)(m-BDC), (6) MOF-841, having formula $Zr_6O_4(OH)_4(MTB)_2(HCO_2)(H_2O)_2$, (7) MIL-68-$NH_2$, having formula M(OH)(BDC-$NH_2$), or combinations thereof, where BDC can be either 1,3-benzenedicarboxylate or 1,4-benzenedicarboxylate, BTDD is bis(1,2,3-triazolo[4,5-b], [40,50-i])dibenzo[1,4]dioxin, MTB is 4,4',4'',4'''-Methanetetrayltetrabenzoate, BDC-$NH_2$ is 2-amino-1,4-benzenedicarboxylate, and M is aluminum, gallium, indium, or iron, (8) or combinations thereof.

7. An air conditioner comprising,
an intake mechanism configured to draw into the air conditioner a first amount of air and an amount of moisture from an exterior of the air conditioner;
a module in fluid communication with the intake mechanism, the module comprising:
a plurality of metal organic frameworks, the metal organic frameworks configured to adsorb the amount of moisture from the first amount of air; and
an indirect evaporative cooler configured to cool the first amount of air, the indirect evaporative cooler comprising a barrier membrane having a first side and a second side, the first side positioned to contact the first amount of air prior to being cooled, and the second side configured to contact a cooling stream formed from a combination of a third amount of air from outside of the air conditioner and a portion of the first amount of air that is siphoned from the first amount of air after the first amount of air is cooled, and wherein the cooling stream is fed back into the indirect evaporative cooler; and a solar heater configured to heat a second amount of air, wherein the second amount of air is configured to regenerate the metal organic frameworks.

8. The air conditioner of claim 7, wherein the metal organic frameworks has a water adsorption capacity of more than 50 percent by weight.

9. The air conditioner of claim 7, wherein the metal organic frameworks comprise a plurality of particles having a particle size of less than 1 micron.

10. The air conditioner of claim 7, wherein the solar heater is an only heat source comprised in the air conditioner.

11. The air conditioner of claim 7, wherein the intake mechanism is a first intake mechanism, and wherein the air conditioner comprises a second intake mechanism configured to draw into the air conditioner the second amount of air from the exterior of the air conditioner.

12. The air conditioner of claim 7, wherein the metal organic frameworks are selected from the group consisting of (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I(Zn/Co), having formula $Zn_xCo_{5-x}Cl_4(BTDD)_3$, where x is 2 or 3, (4) $Co_2Cl_2(BTDD)$, having formula $Co_2Cl_2(BTDD)$, (5) CAU-10 having formula Al(OH)(m-BDC), (6) MOF-841, having formula $Zr_6O_4(OH)_4(MTB)_2(HCO_2)(H_2O)_2$, (7) MIL-68-$NH_2$, having formula M(OH)(BDC-$NH_2$), or combinations thereof, where BDC can be either 1,3-benzenedicarboxylate or 1,4-benzenedicarboxylate, BTDD is bis(1,2,3-triazolo[4,5-b], [40,50-i])dibenzo[1,4]dioxin, MTB is 4,4',4'',4'''-Methanetetrayltetrabenzoate, BDC-$NH_2$ is 2-amino-1,4-benzenedicarboxylate, and M is aluminum, gallium, indium, or iron, (8) or combinations thereof.

13. The air conditioner of claim 7, wherein the indirect evaporative cooler is further configured to cool the metal organic frameworks.

14. A method of air conditioning comprising:
drawing a first amount of air into an interior of an air conditioner from an exterior of the air conditioner, the first amount of air including an amount of moisture;
adsorbing the amount of moisture into a plurality of unsaturated metal organic frameworks to form a plurality of partially saturated metal organic frameworks;
cooling the first amount of air with an indirect evaporative cooler;
heating a second amount of air with a solar heater to form an amount of hot air, wherein the hot air has a temperature greater than a temperature of the second amount of air; and
regenerating the partially saturated metal organic frameworks to form the unsaturated metal organic frameworks by removing the amount of moisture by contacting the amount of hot air with the partially saturated metal organic frameworks,
wherein the indirect evaporative cooler comprises a barrier membrane having a first side and a second side, the first side positioned to contact the first amount of air prior to being cooled, and the second side configured to contact a cooling stream formed from a combination of a third amount of air from outside of the air conditioner and a portion of the first amount of air that is siphoned from the first amount of air after the first amount of air is cooled, and wherein the cooling stream is fed back into the indirect evaporative cooler.

15. The method of claim 14, wherein the temperature of the hot air is less than 90 degrees Celsius.

16. The method of claim 14, wherein the second amount of air is drawn into the air conditioner from the exterior of the air conditioner.

17. The method of claim 14, wherein the solar heat is an only heat source comprised in the air conditioner.

18. The method of claim 14, wherein the unsaturated metal organic frameworks are selected from the group consisting of (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I (Zn/Co), having formula $Zn_xCo_{5-x}Cl_4(BTDD)_3$, where x is 2 or 3, (4) $Co_2Cl_2(BTDD)$, having formula $Co_2Cl_2(BTDD)$, (5) CAU-10 having formula Al(OH)(mBDC), (6) MOF-841, having formula $Zr_6O_4(OH)_4(MTB)_2(HCO_2)(H_2O)_2$, (7) MIL-68-$NH_2$, having formula $M(OH)(BDC-NH_2)$, or combinations thereof, where BDC can be either 1,3-benzenedicarboxylate or 1,4-benzenedicarboxylate, BTDD is bis(1,2,3-triazolo[4,5-b], [40,50-i])dibenzo[1,4]dioxin, MTB is 4,4',4",4"'-Methanetetrayltetrabenzoate, $BDC-NH_2$ is 2-amino-1,4-benzenedicarboxylate, and M is aluminum, gallium, indium, or iron, (8) or combinations thereof.

19. The method of claim 14, wherein the partially saturated metal organic frameworks are selected from the group consisting of (1) MIL-101 (Cr) having formula $Cr_3(O)(OH)(BDC)_3(H_2O)_2$, (2) MFU-4I(Zn) having formula $Zn_5Cl_4(BTDD)_3$, (3) MFU-4I(Zn/Co), having formula $Zn_xCo_{5-x}Cl_4(BTDD)_3$, where x is 2 or 3, (4) $Co_2Cl_2(BTDD)$, having formula $Co_2Cl_2(BTDD)$, (5) CAU-10 having formula Al(OH)(mBDC), (6) MOF-841, having formula $Zr_6O_4(OH)_4(MTB)_2(HCO_2)(H_2O)_2$, (7) MIL-68-$NH_2$, having formula $M(OH)(BDC-NH_2)$, or combinations thereof, where BDC can be either 1,3-benzenedicarboxylate or 1,4-benzenedicarboxylate, BTDD is bis(1,2,3-triazolo[4,5-b], [40,50-i])dibenzo[1,4]dioxin, MTB is 4,4',4",4"'-Methanetetrayltetrabenzoate, $BDC-NH_2$ is 2-amino-1,4-benzenedicarboxylate, and M is aluminum, gallium, indium, or iron, (8) or combinations thereof.

20. The method of claim 14 further comprising cooling the unsaturated metal organic frameworks with the indirect evaporative cooler.

21. The air conditioner of claim 1, wherein the metal organic frameworks comprises MIL-101 (Cr) having formula $Cr_3(O)(OH)(BDC)_3(H_2O)_2$, wherein BDC can be either 1,3-benzenedicarboxylate or 1,4-benzenedicarboxylate.

22. The air conditioner of claim 1, wherein the metal organic frameworks comprises MFU-4I(Zn) having formula $Zn_5Cl_4(BTDD)_3$, wherein BTDD is bis(1,2,3-triazolo[4,5-b], [40,50-i])dibenzo[1,4]dioxin.

23. The air conditioner of claim 1, wherein the metal organic frameworks comprises MFU-4I(Zn/Co), having formula $Zn_xCo_{5-x}Cl_4(BTDD)_3$, wherein x is 2 or 3, and wherein BTDD is bis(1,2,3-triazolo[4,5-b], [40,50-i])dibenzo[1,4]dioxin.

24. The air conditioner of claim 1, wherein the metal organic frameworks comprises $Co_2Cl_2(BTDD)$, having formula $Co_2Cl_2(BTDD)$, wherein BTDD is bis(1,2,3-triazolo[4,5-b], [40,50-i])dibenzo[1,4]dioxin.

25. The air conditioner of claim 1, wherein the metal organic frameworks comprises CAU-10 having formula Al(OH)(mBDC), wherein BDC can be either 1,3-benzenedicarboxylate or 1,4-benzenedicarboxylate.

26. The air conditioner of claim 1, wherein the metal organic frameworks comprises MOF-841, having formula $Zr_6O_4(OH)_4(MTB)_2(HCO_2)(H_2O)_2$, wherein MTB is 4,4',4",4"'-Methanetetrayltetrabenzoate.

27. The air conditioner of claim 1, wherein the metal organic frameworks comprises MIL-68-$NH_2$, having formula $M(OH)(BDC-NH_2)$, wherein $BDC-NH_2$ is 2-amino-1,4-benzenedicarboxylate, and wherein M is aluminum, gallium, indium, or iron.

* * * * *